United States Patent [19]
Harris et al.

[11] Patent Number: 6,025,404
[45] Date of Patent: Feb. 15, 2000

[54] RAPID SET LATEXES AND FOAMED ARTICLES PREPARED THEREFROM

[75] Inventors: John K. Harris; Gene D. Rose; Donald L. Schmidt, all of Midland, Mich.

[73] Assignee: The Dow Chemical Company, Midland, Mich.

[21] Appl. No.: 09/027,019

[22] Filed: Feb. 20, 1998

[51] Int. Cl.$^7$ .................................................. C08J 9/30
[52] U.S. Cl. .................................................. 521/65; 521/72
[58] Field of Search .......................................... 521/65, 72

[56] References Cited

U.S. PATENT DOCUMENTS

| | | |
|---|---|---|
| 3,947,396 | 3/1976 | Kangas et al. . |
| 4,431,768 | 2/1984 | Wessling et al. .................... 521/65 |
| 4,544,697 | 10/1985 | Pickelman et al. ................... 524/458 |
| 4,544,723 | 10/1985 | Upson et al. . |
| 4,582,663 | 4/1986 | Pickelman et al. . |
| 4,622,360 | 11/1986 | Gomi et al. . |
| 4,704,324 | 11/1987 | Davis et al. . |
| 4,859,384 | 8/1989 | Fibiger et al. . |
| 4,929,666 | 5/1990 | Schmidt et al. . |
| 5,124,363 | 6/1992 | Stern ................................ 521/65 |
| 5,310,581 | 5/1994 | Schmidt et al. . |
| 5,674,934 | 10/1997 | Schmidt et al. . |
| 5,696,174 | 12/1997 | Chao et al. ............................ 521/65 |

OTHER PUBLICATIONS

Chemical Reg. No. 45076–54–8.
Chemical Reg. No. 51441–64–6.
Chemical Reg. No. 63810–34–4.
Chemical Reg. No. 73082–48–1.
Chemical Reg. No. 82667–45–6.
Chemical Reg. No. 93926–67–1.
Chemical Reg. No. 122988–32–3.
Chemical Reg. No. 145425–78–1.
Chemical Reg. No. 149186–03–8.
Chemical Reg. No. 151938–12–4.
Chemical Reg. No. 166740–88–1.
Daniels, E. S. et al., Progress in Organic Coatings, vol. 19, pp. 359–378 (1991).
Kötz, J. et al., Acta Polymer, vol. 43, pp. 193–198 (1992).
Ooka, M. et al., Progress in Organic Coatings, vol. 23, pp. 325–338 (1994).
Padget, J. C., Journal of Coatings Technology, vol. 66, No. 839, pp. 89–105 (Dec. 1994).
Shalbayeva, G. B. et al., Polymer Science U.S.S.R., vol. 26, No. 6, pp. 1421–1427 (1984).

*Primary Examiner*—Morton Foelak

[57] ABSTRACT

Rapid set cellular articles can be prepared from a latex by the steps of: a) frothing a latex that contains a dispersed polymer having pendant cationic groups or adsorbing cationic molecules or both, and pendant acid groups; and b) rendering the frothed latex sufficiently basic to make the cellular article. The cellular articles of the present invention are advantageously prepared at ambient temperatures and pressures, and in the absence of organic solvents or CFCs.

25 Claims, No Drawings

RAPID SET LATEXES AND FOAMED ARTICLES PREPARED THEREFROM

BACKGROUND OF THE INVENTION

This invention relates to rapid set latexes and rapid set foamed articles prepared therefrom. Foamed polymeric materials, also known as cellular materials, have an apparent density with respect to the polymeric material that is substantially decreased by the presence of numerous gaseous pockets (i.e., cells) disposed throughout its mass. If the cells are interconnected, the material is considered open-celled; if the cells are discrete, the material is considered closed-celled.

Cellular materials are typically prepared by dispersing gas bubbles throughout a fluid polymer to create a froth, then preserving the resultant state to form the cellular material. Bubble initiation can be promoted in a number of ways including supersaturating a polymer solution with a gas at high temperatures; incorporating low boiling liquids into the system as blowing agents and forcing the liquids into the gas phase by increasing the temperature or decreasing the pressure; and incorporating blowing agents that thermally decompose to form a gas. Unfortunately, the polymer typically needs to be dissolved in an organic solvent, the bubble initiation generally requires temperature or pressure control or both, and in many instances, the methods require environmentally undesirable blowing agents (for example, CFCs).

In view of the deficiencies in the art, it would be advantageous to prepare a foamed structure by a process that did not require ancillary solvents or environmentally undesirable blowing agents, and that could be carried out effectively at ambient temperatures and pressures.

SUMMARY OF THE INVENTION

The present invention addresses a need in the art by providing a simple, fast, and environmentally friendly method for preparing a cellular article from a latex. Accordingly, in one aspect, the present invention is a process for preparing a cellular article comprising the steps of: a) frothing a latex that contains a dispersed polymer having pendant cationic groups or adsorbing cationic molecules or both, and pendant acid groups; and b) rendering the frothed latex sufficiently basic to make the cellular article.

In a second aspect, the present invention is a cellular article that comprises a coacervate of a polymer having pendant cationic groups or adsorbing cationic groups or both, and pendant acid groups.

In a third aspect, the present invention is a stable aqueous dispersion that contains a dispersed polymer having pendant weak cationic groups or adsorbing cationic groups or both, and pendant weak acid groups.

The cellular article of the present invention is advantageously prepared at ambient temperatures and pressures, and in the absence of organic solvents or CFCs. The cellular article can be prepared relatively quickly from the frothed dispersion as a result of the rapidity with which the solution or dispersion sets when contacted with a sufficient amount of base. This rapid-setting property prevents the collapse of the cellular article during its preparation and also prevents deformation of the shape of the cellular article, for example, by slumping.

DETAILED DESCRIPTION OF THE INVENTION

The cellular article of the present invention is prepared by frothing a latex containing a polymer having pendant or adsorbing cationic groups and pendant acid groups, and rendering the frothed dispersion sufficiently basic to form the cellular latex article. As used herein, the term "pendant" is used to refer to a group that is chemically bound to the polymer backbone. The term "adsorbing cationic molecule" is used herein to refer to a molecule that contains a cationic group that is capable of physically adsorbing to a latex particle. The polymer having pendant cationic groups and pendant acid groups can be prepared by polymerizing a polymerizable cationic monomer and an acid monomer, more preferably by polymerizing a polymerizable strong cationic monomer and a weak acid monomer. A polymer that is prepared in such a manner is said to contain structural units formed from the polymerization of a polymerizable cationic monomer and a polymerizable acid monomer, more preferably a polymerizable weak acid monomer.

It is also possible to prepare a polymer that has pendant strong acid groups such as sulfonic acid groups, and weak cation groups such as protonated primary, secondary, or tertiary amines, so long as the pH of the latex is sufficiently low such that the net charge of the latex particles is cationic and the latex is stable. Furthermore, it is possible to prepare a polymer that has pendant weak acid groups and pendant weak cationic groups, again, provided that the pH of the latex is sufficiently low such that the net charge of the latex particles is cationic and the latex is stable.

As used herein, the term "sufficiently basic" refers to sufficiency of amount of base as well as base strength. The word "latex" refers to a stable aqueous dispersion and can be synthetic or artificial. The term "polymerizable weak acid monomer" refers to a monomer that contains ethylenic unsaturation and an anionic group having a charge that depends on pH. The term "structural units formed from the polymerization of . . . " is illustrated by the following example:

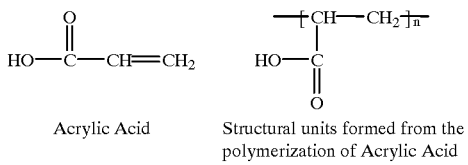

Acrylic Acid      Structural units formed from the polymerization of Acrylic Acid The polymer also preferably includes structural units formed from the polymerization of a polymerizable non-interfering monomer. The term "polymerizable non-interfering monomer" is used herein to refer to a monomer that does not adversely affect the formation of the cellular structure.

Polymerizable weak acid monomers that are suitable for the preparation of the latex used to prepare the cellular article include ethylenically unsaturated compounds having carboxylic acid, phenolic, thiophenolic, or phosphinyl functionality. Preferred polymerizable weak acid monomers include acrylic acid, methacrylic acid, itaconic acid, β-carboxyethyl acrylate (usually as a mixture of acrylic acid oligomers), vinylbenzoic acid, and 2-propenoic acid: 2-methyl-, (hydroxyphosphinyl) methyl ester. Acrylic acid and methacrylic acid are more preferred weak acid monomers. Thus, preferred pendant acid groups are carboxylic acid groups.

Suitable polymerizable cationic monomers include polymerizable strong cationic monomers and polymerizable weak cationic monomers. As used herein, the term "polymerizable strong cationic monomer" refers to a monomer that contains ethylenic unsaturation and a cationic group having a charge that is independent of pH. The polymerizable cationic monomer is associated with a counterion, which may be, for example, halide such as chloride, bromide, or iodide, as well as nitrate, or methylsulfate. The term "polymerizable weak cationic monomer" refers to a monomer that contains ethylenic unsaturation and a cationic group having a charge that is dependent on pH.

Polymerizable strong cationic monomers include salts of ethylenically unsaturated compounds having quaternary ammonium, sulfonium, cyclic sulfonium, and phosphonium functionality, with salts of ethylenically unsaturated quaternary ammonium salts being preferred. Examples of suitable monomers having quaternary ammonium functionality include ethylenically unsaturated trialkylammonium salts such as vinylbenzyl trialkylammonium chloride or bromide; such as vinylbenzyl trimethylammonium chloride or a polymerizable surfactant such as vinylbenzyl dimethyloctadecylammonium chloride; trialkylammoniumalkyl acrylates or methacrylates such as 2-((methacryloyloxy)ethyl)-trimethylammonium chloride and N,N-diethyl-N-methyl-2-((1-oxo-2-propenyl)oxy) ethanaminium methyl sulfate (Chem. Abstracts Reg. No. 45076-54-8); and trialkylammoniumalkyl acrylamides such as N,N,N-trimethyl-3-((2-methyl-1-oxo-2-propenyl)amino)-1-propanaminium chloride (Chem. Abstracts Reg. No. 51441-64-6) and N,N-dimethyl-N-(3-((2-methyl-1-oxo-2-propenyl)amino) propyl]-benzenemethaminium chloride (Chem. Abstracts Reg. No. 122988-32-3). A preferred polymerizable quaternary ammonium salt is 2-((methacryloyloxy)ethyl])-trimethylammonium chloride.

Examples of polymerizable unsaturated sulfonium salts include dialkylsulfonium salts such as [4-ethoxy-3-(ethoxycarbonyl)-2-methylene-4-oxobutyl] dimethylsulfonium bromide (Chem. Abstracts Reg. No. 63810-34-4); and vinylbenzylvinylbenzyldialkylsulfonium salts such as vinylbenzyldimethylsulfonium chloride. Examples of polymerizable cyclic sulfonium salts include 1-[4-[(ethenylphenyl)methoxy]phenyl]tetrahydro-2H-thiopyranium chloride (Chem. Abstracts Reg. No. 93926-67-1); and vinylbenzyltetrahydrothio-phenonium chloride, which can be prepared by the reaction of vinylbenzyl chloride with tetrahydrothiophene.

Examples of polymerizable phosphonium salts include 2-methacryloxyethyltri-$C_1$–$C_{20}$-alkyl-, aralkyl-, or arylphosphonium salts such as 2-methacryloxyethyltri-n-octadecylphosphonium halide (Chem. Abstracts Reg. No. 166740-88-1); tri-$C_1$–$C_{18}$-alkyl-, aralkyl-, or arylvinylbenzylphosphonium salts such as trioctyl-3-vinylbenzylphosphonium chloride, trioctyl-4-vinylbenzylphosphonium chloride (Chem. Abstracts Reg. No. 15138-12-4), tributyl-3-vinylbenzylphosphonium chloride, tributyl-4-vinylbenzylphosphonium chloride (Chem. Abstracts Reg. No. 149186-03-8), triphenyl-3-vinylbenzylphosphonium chloride, and triphenyl-4-vinylbenzylphosphonium chloride (Chem. Abstracts Reg. No. 145425-78-1); $C_3$–$C_{18}$-alkenyltrialkyl-, aralkyl-, or aryl-phosphonium salts such as 7-octenyltriphenylphosphonium bromide (Chem. Abstracts Reg. No. 8266745-6); and tris(hydroxymethyl)(1-hydroxy-2-propenyl)phosphonium salts (Chem. Abstracts Reg. No. 7308248-1).

It is also possible to prepare the polymer by polymerizing a monomer that contains both a weak acid group and a cationic group. An example of such a monomer is N-(4-carboxy)benzyl-N,N-dimethyl-2-[(2-methyl-1-oxo-2-propenyl)-oxy] ethanaminium chloride.

It is further possible to prepare a polymer having pendant strong cationic groups and weak acid groups by adding strong cationic functionality to an already prepared polymer. For example, a polymerizable monomer having a weak acid group can be copolymerized with a polymerizable non-interfering monomer containing an electrophilic group, such as a vinylbenzyl halide or a glycidyl methacrylate, to form a polymer having a weak acid group and an electrophilic group. This polymer can then be post-reacted with a nucleophile such as a tertiary amine or a dialkyl sulfide, which can displace the halide group or oxirane groups and form a benzylonium salt as illustrated:

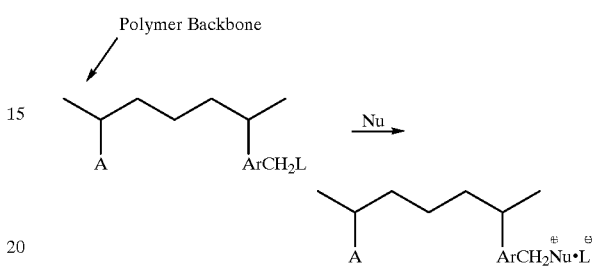

where A is a pendant weak acid group; Ar is an aromatic group, preferably a phenyl group; L is a leaving group, preferably a halide group, more preferably a chloride group; and Nu is preferably a dialkyl sulfide such as dimethyl sulfide and diethyl sulfide; a cyclic sulfide such as tetrahydrothiophene; or a tertiary amine such as trimethyl amine, triethyl amine, tripropyl amine, tributyl amine, and triethanol amine.

In another example of adding strong cationic functionality to an already prepared polymer, a polymer backbone that contains pendant acid groups and a tertiary amine or a sulfide can be post-reacted with a suitable alkylating reagent such as an alkyl halide to form a polymer that contains acid groups and strong cationic groups:

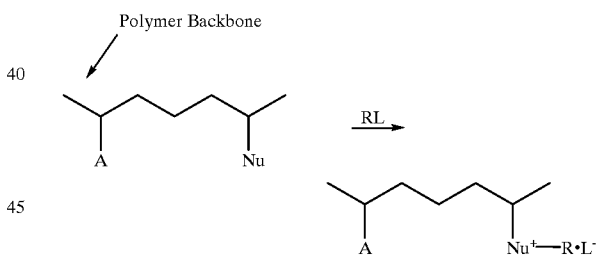

where RL is an alkylating reagent.

Suitable polymerizable weak cationic monomers include ethylenically unsaturated protonated primary, secondary, and tertiary amines such as salts of dialkylaminoalkylacrylates, dialkylaminoalkylmethacrylates, aminoalkylacrylates, aminoalkylmethacrylates, aminoacrylates, and aminomethacrylates. Examples of polymerizable weak cationic monomers include the hydrochloride salts of dimethylaminoethylmethacrylate and aminoethylmethacrylate.

Examples of non-interfering polymerizable monomers include acrylates such as methyl acrylate, ethyl acrylate, butyl acrylate, 2-hydroxyethyl acrylate, 2-hydroxypropyl acrylate, glycidyl acrylate, and allyl acrylate; methacrylates such as methyl methacrylate, ethyl methacrylate, butyl methacrylate, allyl methacrylate, glycidyl methacrylate, 2-hydroxyethyl methacrylate, and 2-hydroxypropyl methacrylate; and $C_1$–$C_4$ alkyl- or alkenyl-substituted styrenics, preferably styrene, α-methylstyrene, vinyltoluene, and vinylbenzyl chloride. Other examples of non-interfering species include $C_3$–$C_{18}$-perfluoroalkyl methacrylates such as 2-(perfluorooctyl)ethyl methacrylate; $C_3$–$C_{18}$-perfluoroalkyl acrylates such as 2-[ethyl [(heptadecafluorooctyl)-sulfonyl]amino]ethyl 2-propenoate; and $C_3$–$C_{18}$-perfluoro-alkyl vinylbenzenes. (See U.S. Pat. No. 4,929,666, column 4, lines 54 to 68, and column 5, lines 1 to 30.)

The latex may contain adsorbing cationic molecules as an alternative to, or in addition to pendant cationic groups. Adsorption of a molecule onto the latex particle can be determined by the separation of the particles from the serum phase, for example, by sedimentation of the latex particles, followed by analysis of the serum phase for the molecules. Adsorption is indicated by a serum phase concentration of the molecules that is less than that which was added to the latex. These adsorbed groups can be removed by extraction, for example, by dialysis or addition of a suitable solvent.

The adsorbing cationic molecules, which need not be polymerizable, contain either a strong cationic group or a weak cationic group and a hydrophobic portion. If the molecules are not polymerizable, the hydrophobic portion is typically a branched or linear alkyl group having a chain length of preferably not less than 10 carbon atoms, more preferably not less than 12, and most preferably not less than 16. Examples of preferred adsorbing cationic molecules include long chain alkyl quaternary ammonium salts such as trimethyloctadecyl ammonium chloride, trimethylhexadecyl ammonium chloride, and trimethyldodecyl ammonium chloride.

The ratio of the pendant acid groups to the pendant cationic groups or adsorbing cationic molecules is application dependent, but is generally in the range of about 1:10 to about 5:1. The ratio of the structural units formed from the polymerization of the polymerizable non-interfering monomer to the weak acid groups and the cationic groups is application dependent, but is preferably not less than about 70:30, more preferably not less than about 80:20, more preferably not less than about 90:10, and most preferably not less than about 94:6; and preferably not greater than about 99.5:0.5, more preferably not greater than about 99:1, and most preferably not greater than about 98:2.

In general, the higher the latex solids content, the lower the concentration of the total ionic species that is required to form the quick-set foam. The solids content of the latex in the formulation to be frothed is application dependent, but preferably not less than 10, more preferably not less than 20, and most preferably not less than 30 weight percent, and preferably not more than 60, more preferably not more than 55, and most preferably not more than 50 weight percent.

The latex can be prepared by any suitable means, and is advantageously prepared by the steps of: 1) preparing a seed latex; 2) diluting the seed latex with water; 3) contacting the diluted solution with a radical initiator, a polymerizable non-interfering monomer, a polymerizable weak acid monomer, and a polymerizable or non-polymerizable cationic monomer; and 4) polymerizing the solution from step 3 under such conditions to form a latex having non-interfering groups, pendant cationic groups or adsorbing cationic molecules, and pendant weak acid groups.

The seed latex is preferably prepared by emulsion polymerization in a batch process using a cationic surfactant. The seed latex acts as a locus of polymerization for subsequent monomer addition, so that the formation of new particles is minimized and greater uniformity in the distribution of particle size in the final product is achieved. Thus, the monomer or monomers used to prepare the seed latex are chosen to form particles that have an affinity for the monomers subsequently added, so that polymerization occurs preferentially in or on the seed latex particles. The extent to which the seed latex is diluted in step 2 is a function of the desired particle size and the percent solids in the final latex, and can be readily determined by one of ordinary skill in the art.

It is also possible to prepare a latex from a preformed polymer. The preformed polymer can be dissolved in a suitable solvent, then dispersed in water by any suitable method. The solvent can then be removed and the solids content adjusted to form a so-called artificial latex.

The latex can be frothed and sequentially or concomitantly rendered sufficiently basic to form a coacervated cellular article by a variety of methods. As used herein, "coacervation" refers to the setting of an article by a pH shift. For example, a dispersing fluid can be entrained and dispersed under shear into a mixture of the latex and the frothing agent to form the frothed latex, which can then be converted to the cellular material (that is, set) by adding base thereto. Dispersing fluids include gases and volatile liquids known in the art. Preferred dispersing fluids include air, nitrogen, carbon dioxide, argon, and helium.

The base may be added as a gas, a liquid, a solid, or a dispersion. Suitable bases include, but are not restricted to, amines, ammonia, alkali metal and alkaline earth metal phosphates, carbonates, bicarbonates, oxides, and hydroxides. Preferred bases include calcium carbonate, calcium oxide, calcium hydroxide, sodium hydroxide, potassium hydroxide, magnesium hydroxide, sodium bicarbonate, sodium carbonate, and ammonia (aqueous or gaseous); as well as basic rheology enhancing filler materials such as Portland cement, aluminous cement, and inorganic mortar. (In general, both basic and non-basic filler materials may be added to increase density, load bearing, and sound attenuation, and in some instances, reduce costs of the cellular material.)

Alkali metal hydroxides are preferably added as solutions in water, while alkaline earth metal hydroxides, calcium carbonate, Portland cement, aluminous cement, and inorganic mortar are preferably added as aqueous dispersions, more preferably in the presence of a cationic surfactant.

It is also possible to render the latex basic by removing acid. For example, if the counterion associated with the cation is bicarbonate and the pH of the latex is lowered by the presence of $CO_2$, the latex can be rendered basic by loss of $CO_2$.

The frothing agent is preferably cationic or non-ionic, or a combination thereof, more preferably cationic. The frothing agent may be inherently present in the latex (that is, the latex may be prepared in the presence of a cationic dispersant that acts as a frothing agent), or may be added to the latex in a separate step. The selection of a frothing agent is generally dictated by the presence and type of filler material in the formulation used to prepare the foam. Examples of suitable frothing agents include FLUORAD™ FC-135 fluorinated alkyl quaternary ammonium cationic surfactant (a trademark of 3M Corp.), KEMAMINE™ Q9973-C soyatrimethyl ammonium chloride (a trademark of Witco Corp.), ARQUAD™ 18/50 steartrimonium chloride (CAS 112-03-8, a trademark of Akzo Chemical Co.), DUOMEEN™ TDO (N-tallow-1,3-propandiamine dioleate, CAS 61791-53-5, a trademark of Akzo Chemical Co.), ETHOMEEN™ T15 (PEG-5 tallow amine, CAS 61791-26-2, a trademark of Akzo Chemical Co.), a blend of ETHOMEEN™ T15 and DUOMEEN™ TDO, and a blend of ARQUAD™ 18/50 steartrimonium chloride and DUOMEEN™ TDO. Other examples of cationic frothing agents include those useful as adsorbing cationic molecules, described hereinabove.

The amount of frothing agent that is used tends to depend on factors such as the amount and type of foam desired, the type of frothing agent used, and the means used for preparing the foam. Preferably, the amount of frothing agent used is not greater than about 10 percent, more preferably not greater than about 5 percent, most preferably not greater than about 3 weight percent based on the weight of the latex and the surfactant, and preferably not less than about 0.1 weight percent, more preferably not less than about 0.5 weight percent.

The latex may also be combined with an aqueous dispersion of a frothing agent and a substantially non-basic or amphoteric filler material under conditions of stirring, and in the presence of a dispersing fluid, to form the frothed latex. In this instance, a sufficient amount of a suitable base can be combined with the frothed latex to convert it to the cellular material. Examples of non-basic fillers include carbon, clay, talc, titanium oxide, barium sulfate, stannous octoate, mica, glass, and Al(OH)$_3$.

It is also possible to form a foamed article by introducing a blowing agent into the rapid set latex formulation, then expanding the resulting formulation by methods well known in the art to from a cellular material. The blowing agent may be present with or without the frothing agent.

Base need not be added to the frothed latex to render the latex basic. For example, the latex can be rendered basic by frothing in the presence of a suitable dispersing fluid a latex that contains a bicarbonate ion associated with the strong cation group. The pH of the latex is raised sufficiently to form the latex foam as a result of the loss of $CO_2$. Thus, the latex is rendered basic by the loss of an acid.

To obtain the bicarbonate salt, the latex can be ion exchanged with bicarbonate ion, by first saturating the latex under pressure with carbon dioxide, either as dry ice or as a gas, then contacting the $CO_2$-saturated latex with an ion exchange resin that contains bicarbonate functionality such as DOWEX™ Monosphere 550A anion exchange resin (a trademark of The Dow Chemical Company) in the bicarbonate form. The pH of the latex is sufficiently low to render the polymer stable in the continuous phase, preferably lower than the $pK_a$ of the weak acid group, more preferably not greater than 5, and most preferably not greater than 4.

The cellular article of the present invention is useful in applications that are typical of cellular articles, including applications that require sound deadening, light weight, fluid absorption, and insulation.

The following examples are for illustrative purposes only and are not intended to limit the scope of this invention.

EXAMPLE 1

Rapid Set Foam Prepared Using Powdered Alkaline Solid

The stable aqueous dispersion was prepared in a two-step process. First, a cationic surfactant stabilized polystyrene seed latex was prepared using a batch process. Next, a portion of the seed latex was used in a continuous addition process to prepare a second latex containing a carboxylic acid and a quaternary ammonium functional monomer.

The cationic latex seed was prepared in the following manner. To a 1-liter, 3-neck, glass reaction flask equipped with a nitrogen inlet, a reflux condenser with a nitrogen outlet, and a mechanical stirrer was added with stirring styrene (100 g), 40 g ARQUAD™ 18-50 octadecyltrimethylammonium chloride surfactant (a trademark of Akzo Nobel, 20 g active), hydrogen peroxide (3.3 g, 1.0 g active), water (200 g), and $FeSO_4.7H_2O$ solution (0.25 g of a 0.25 weight percent solution of aqueous $FeCl_3$). The flask was heated to 70° C. over 2 hours with stirring under nitrogen, after which the stirring was stopped and the heating source removed. The latex seed was allowed to sit overnight in the flask. The result was an opaque, high viscosity dispersion with 35.8 percent solids. The particle size was 407 Å (mean value) and 393 Å (median value).

The foam-forming latex was prepared from the cationic seed latex using a continuous addition polymerization method. Syringe pumps were used as the continuous addition control means. To a 2-liter, 3-neck, glass reaction flask equipped with a nitrogen inlet, a reflux condenser with a nitrogen outlet, and a mechanical stirrer was added, with stirring, water (452.3 g) and the cationic seed latex (8.8 g). The flask was heated to 60° C. Table 1 shows the solutions that were prepared for continuous addition.

TABLE 1

Reagents used to Prepare the Latex

| Stream | Component | Amount |
|---|---|---|
| 1 | Butyl Acrylate | 176 g |
|  | Methyl Methacrylate | 124 g |
|  | Methacrylic Acid | 5.3 g |
| 2 | M-QUAT™ [a] | 17.3 g (12.8 g active) |
| 3 | t-Butylhydroperoxide | 1.8 g (1.3 g active) |
| 4 | Sodium Formaldehyde Sulfoxylate | 0.96 g in 10 ml water |

[a]2-((methacryloyloxy)ethyl) trimethylammonium chloride obtained as a 74 percent aqueous solution from Bimax Inc., 717 Chesapeake Ave., Baltimore, MD 21225

The components from the four streams were added over the first four hours of After completion of addition, polymerization was continued at 60° C. for 0.5 hour. The resulting latex was filtered and found to have a solids content of 37.0 percent. Table 2 shows the composition of the latex.

TABLE 2

Composition of the Latex

| Monomer | Weight Percent | Mole Percent | Molecular Weight (g/mol) |
|---|---|---|---|
| Butyl Acrylate | 55.3 | 50.2 | 128.1 |
| Methyl Methacrylate | 39.0 | 45.3 | 100.1 |
| Methacrylic Acid | 1.7 | 2.3 | 86.1 |
| M-QUAT | 4.0 | 2.3 | 207.7 |

The particle size was 1550 Å (mean) and 1450 Å (median).

To a portion of the latex (19.0 g) was added Dow Corning 193 dimethicone copolyol nonionic silicone surfactant (0.35 g) and FLUORAD™ FC-135 fluorinated alkyl quaternary ammonium iodide cationic surfactant (a trademark of 3M Corporation, 0.02 g, 25 weight percent). The mixture is stirred to produce a froth, whereupon dry, ceramic wall cement (10 g, obtained as a powder from Color Tile Man, Inc.) was added using high speed stirring over 30 seconds. After about 2 minutes, a semisolid cellular article (i.e., a foam) having less than 1-mm diameter cells was obtained.

EXAMPLE 2

Rapid Set Foam Using a Dispersed Alkaline Solid

A portion of the latex prepared as described in Example 1 (25.7 g) was added to a container sequentially with a cationic fluorocarbon solution (0.18 g, containing 6.0 weight percent FLUORAD FC-135 fluorinated alkyl quaternary ammonium iodide cationic surfactant, 69.9 weight percent water, and 26.1 weight percent isopropanol). A calcium carbonate dispersion (93.35 g, type HOKMH from Hustadmarmor A/S, N-6440 Elnesvagen, Norway) was weighed out in a separate container. A Cowles-type mixing blade was inserted in the mixture of the latex and fluorocarbon solution, and then rotated at 3000 rpm. The HOKMH dispersion was then added in one portion to the rapidly stirred mixture (addition time of less than 5 seconds). The mixing was stopped about 1 minute after the addition of HOKMH dispersion. The resultant cellular material was a semisolid article that could be easily spread with a spatula. After drying at room temperature this cellular material gave a hard, porous structure with the largest pores being about 250 microns. The weight-to-weight ratio of the calcium carbonate to the polymer was about 6.2:1.

EXAMPLE 3

Rapid Set Foam Prepared by Addition of an Alkaline Liquid

A latex was prepared as described in Example 1, except that methacrylic acid was replaced with an equimolar amount of β-carboxyethyl acrylate. A portion of this latex (26.04 g) was placed in a bottle along with a dispersant (0.59 g), the composition of which is shown in Table 3. In a separate bottle was combined deionized water (10.24 g) and sodium bicarbonate (0.27 g). The latex and the dispersant were frothed by bubbling nitrogen up from the base of the bottle, and mixed at 1200 rpm for 30 seconds. The mixing rate was increased to 2600 rpm and maintained at that speed for 1 minute before the bicarbonate solution was added in one portion to the frothed latex. Mixing was continued for about 10 seconds, at which time the froth had begun to set.

TABLE 3

Composition of the Dispersant

| Material | Amount (g) |
| --- | --- |
| DUOMEEN ™ TDO | 10.00 |
| ETHOMEEN ™ 0/15 | 20.00 |
| Deionized water | 120.00 |

EXAMPLE 4

Preparation of a Rapid Set Foam Using Non-polymerizable Cation

The latex was prepared in the same way as the latex used in Example 1, except that an equimolar concentration of ARQUAD™ 18-50 surfactant was used instead of M-QUAT™ monomer. A portion of this latex (10.01 g) was placed into a bottle along with KEMAMINE™ Q9973-C (0.11 g). The latex and dispersant were mixed by agitating at 500 rpm for 1 minute. The dispersion was then frothed by mixing at 1000 rpm for 2 minutes, increasing the speed to 1500 rpm for 30 seconds, then returning the mixing speed to 1000 rpm. A portion of $Mg(OH)_2$ (1.016 g) was then added to the froth and agitation was continued for 15 seconds, at which point the froth was completely set.

EXAMPLE 5

Preparation of a Rapid Set Foam Using a Latex Containing Strong Anionic Charges plus Weak Cationic Charges A foam-forming latex was prepared in a two-step process similar to that in Example 1. First, a cationic stabilized polystyrene seed latex was prepared. Next, a portion of the seed latex was used in a continuous addition process to prepare a second latex containing a sulfonic acid functional monomer and a primary amine functional monomer.

The cationic seed latex was prepared in the following manner: to a 1-liter, 3-necked glass reaction flask equipped with a nitrogen inlet, a reflux condenser with a nitrogen outlet, and a mechanical stirrer, was added 20.0 g of styrene monomer, 40.0 g ARQUAD® 18-50 octadecyltrimethylammonium chloride surfactant (20.0 g active), 400 g deionized water, and 0.25 g of an aqueous ferric sulfate solution (0.25 g ferric sulfate in 100 g water). The flask was heated to 70° C. while the contents were stirred. To this heated, stirred flask was added 3.3 g of 30 weight percent hydrogen peroxide (1 g active) in a continuous addition stream over a period of 3 hours. After 0.5 hours of addition of the hydrogen peroxide, the addition of a stream of styrene was begun and 80 g of styrene was added over the next 2.5 hours. Syringe pumps were used as the continuous addition control means. Three hours after the beginning of the addition of the hydrogen peroxide, the stirring was stopped and the seed was removed from the heat to cool at room temperature. The result of this polymerization was a translucent, low viscosity dispersion with a solids content of 21.6 weight percent. The particle size is 398 Å (mean value) and 378 Å (median value).

The foam-forming latex was prepared from the above cationic seed latex by a continuous addition polymerization method using syringe pumps as the continuous addition control means. To a 1-liter, 3-necked, glass reaction flask equipped with a nitrogen inlet, a reflux condenser with a nitrogen outlet, and a mechanical stirrer was added water (206 g), and the cationic seed latex (7.00 g, 1.50 g active). The flask was heated to 90° C. while the contents were stirred. To this heated, stirred flask were added 5 streams continuously over a time of 4 hours while the temperature of the reaction flask was maintained at 90° C. Table 4 shows the addition streams. Table 5 shows the composition of the latex prepared with these addition streams. In these tables, AMPS stands for 2-acrylamido-2-methylpropane sulfonic acid (Chem. Abstracts No. 15214-89-8) and AEM.HCl stands for the 2-aminoethyl methacrylate hydrochloride (Chem. Abstracts No. 2420-94-2). After completion of the addition, polymerization was continued at 90° C. for 1 hour. The resulting latex was filtered and found to have a solids content of 37.7 weight percent. The particle size is 1439 Å (volume median diameter) and 1807 Å (volume mean diameter).

TABLE 4

Reagents Used to Prepare the Latex

| Stream | Component | Amount (g) |
| --- | --- | --- |
| 1 | Butyl Acrylate | 87.5 |
|   | Methyl Methacrylate | 65.0 |
| 2 | AEM•HCl in Water | 17.3 |
|   |   | (5.2 active) |
| 3 | AMPS | 0.75 |
|   | Water | 20.0 |
| 4 | t-Butylhydroperoxide | 0.90 |
|   | Water | 8.0 |
| 5 | SFS | 0.48 |
|   | Water | 8.0 |

TABLE 5

Composition of the Foam-Forming Latex

| Monomer | Molecular Weight (g/mol) | Weight Percent | Mole Percent |
|---|---|---|---|
| Butyl Acrylate | 128.1 | 44.3 | 49.9 |
| Methyl Methacrylate | 100.1 | 54.0 | 47.5 |
| AEM•HCl | 166,6 | 1,57 | 2.3 |
| AMPS | 207.1 | 0.137 | 0.25 |

To 2.03 g of the latex was added 0.43 g of a 0.20 N NaOH solution. Upon agitating the bottle, the latex completely coacervated within 10 seconds. To 2.04 g of the latex was added 0.05 g of ARQUAD® 18-50 octadecyltrimethylammonium chloride surfactant (0.025 g active). The bottle was agitated and the latex formed a froth. Three incremental additions of 0.20 N NaOH solution were made in the following weights: 0.54 g, 0.44 g, and 0.59 g. The first two additions had no affect; however, the third was sufficient to initiate coacervation.

To a plastic bottle was added 13.15 g of the latex plus 0.06 g of ARQUAD® 18-50 octadecyltrimethylammonium chloride surfactant (0.03 g active). A Caframo stirrer Model BDC 3030 (Wiarton, Ontario) equipped with a Cowles-type blade was used to shear the mixture to froth it. The dispersion was stirred at 600 rpm for 30 seconds. The mixer speed was then increased to 1000 rpm for 2 minutes, followed by 1 minute at 1500 rpm and then another minute at 1000 rpm. At this point, a viscous froth was formed. To this frothed dispersion was added 1.5 g of $Mg(OH)_2$ while mixing was continued. Within 5 seconds some coacervation was observed. Mixing was continued for another 5 seconds, then the sample was removed. The froth appeared to have completely set into a solid shape.

What is claimed is:

1. A process for preparing a cellular article comprising the steps of: a) frothing in the presence of a frothing agent a latex that contains a dispersed polymer having pendant cationic groups or adsorbing cationic molecules or both, and pendant acid groups; and b) rendering the frothed latex sufficiently basic to make the cellular article.

2. The process of claim 1 wherein the polymer further contains structural units formed from the polymerization of a non-interfering monomer.

3. The process of claim 2 wherein the polymer has pendant acid groups that are carboxylic acid groups and pendant cationic groups that are strong cationic groups.

4. The process of claim 3 wherein the pendant strong cationic groups are quaternary ammonium salts.

5. The process of claim 4 wherein the pendant strong cationic groups are units formed from the polymerization of an ethylenically unsaturated trialkylammonium salt.

6. The process of claim 5 wherein the ethylenically unsaturated trialkylammonium salt is 2-((methacryloyloxy)ethyl)-trimethylammonium chloride or N,N-diethyl-N-methyl-2-((1-oxo-2-propenyl)oxy) ethanaminium methyl sulfate.

7. The process of claim 5 wherein the ethylenically unsaturated trialkylammonium salt is 2-((methacryloyloxy)ethyl)-trimethylammonium chloride, the non-interfering monomer is styrene, methyl methacrylate, butyl methacrylate, or a combination thereof, and the pendant acid groups are structural units formed from the polymerization of acrylic acid or methacrylic acid.

8. The process of claim 2 wherein the ratio of structural units formed from the polymerization of the polymerizable non-interfering monomer to the sum of the acid groups plus the cationic groups is not less than about 80:20 and not more than about 99:1.

9. The process of claim 8 wherein the ratio of structural units formed from the polymerization of the polymerizable non-interfering monomer to the sum of the acid groups plus the cationic groups is not less than about 90:10 and not more than about 99:1.

10. The process of claim 7 wherein the ratio of structural units formed from the polymerization of the polymerizable non-interfering monomer to the sum of the acid groups plus the cationic groups is not less than about 94:6 and not more than about 98:2.

11. The process of claim 2 wherein the polymer contains weak cationic groups that are structural units formed from the polymerization of a protonated salt of a dialkylaminoalkylacrylate, a dialkylaminoalkylmethacrylate, an aminoalkylacrylate, an aminoalkylmethacrylate, an aminoacrylate, or an aminomethacrylate.

12. The process of claim 11 wherein the polymer contains structural units formed from the polymerization of a hydrochloride salt of dimethylaminoethylmethacrylate or aminoethylmethacrylate or both.

13. The process of claim 2 wherein the latex contains non-polymerizable adsorbing cationic molecules containing a strong cationic group or a weak cationic group.

14. The process of claim 13 wherein the adsorbing cationic molecule contains a strong cationic group and a hydrophobic portion which is a branched or linear group having a chain length of not less than 12 carbon atoms.

15. The process of claim 14 wherein the adsorbing cationic molecule is trimethyloctadecyl ammonium chloride, trimethylhexadecyl ammonium chloride, or trimethyldodecyl ammonium chloride, or a combination thereof.

16. The process of claim 1 wherein the frothing agent is a cationic surfactant.

17. The process of claim 10 wherein the frothing agent contains a strong cationic group and a hydrophobic portion which is a branched or linear group having a chain length of not less than 12 carbon atoms.

18. The process of claim 2 wherein the frothed latex is formed by entraining a dispersing fluid under shear into a mixture containing the latex and the frothing agent, and a base is added to the frothed latex to form the cellular material, wherein the dispersing fluid is air, nitrogen, argon, helium, or $CO_2$, or a combination thereof.

19. The process of claim 18 wherein the base is added as an aqueous dispersion.

20. The process of claim 19 wherein the base is calcium carbonate, calcium oxide, calcium hydroxide, magnesium hydroxide, Portland cement, aluminum cement, or inorganic mortar, or a combination thereof.

21. The process of claim 2 wherein the frothed latex is rendered basic by the addition thereto of an aqueous solution of sodium hydroxide, sodium bicarbonate, sodium carbonate, ammonia, or potassium hydroxide.

22. The process of claim 2 which further includes the step of contacting the latex with a filler material which is a clay, talc, titanium oxide, a silicate, or $Al(OH)_3$.

23. The process of claim 2 wherein the frothed latex is rendered basic by the loss of $CO_2$.

24. The process of claim 2 wherein the frothed latex is rendered basic by the addition of a basic gas.

25. A cellular article that comprises a coacervate of a polymer having pendant cationic groups or adsorbing cationic groups or both, and pendant weak acid groups.

* * * * *